April 25, 1967 B. B. OHNSTAD 3,315,989
SERVICE OUTLET ASSEMBLY FOR REINFORCED CONCRETE PIPE
Filed May 7, 1964 2 Sheets-Sheet 1
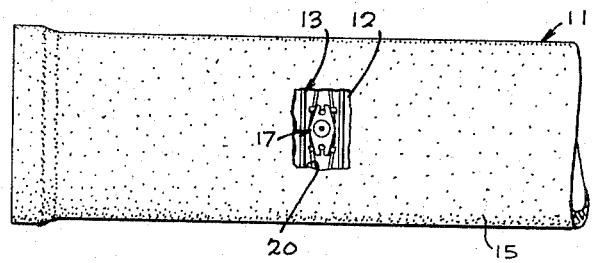
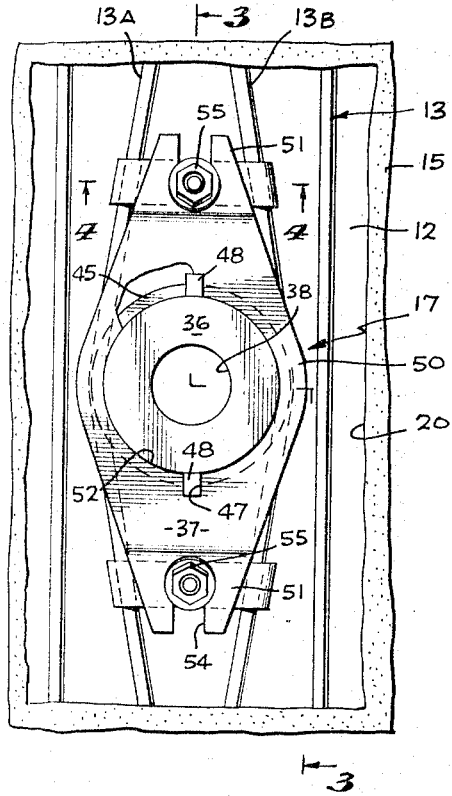
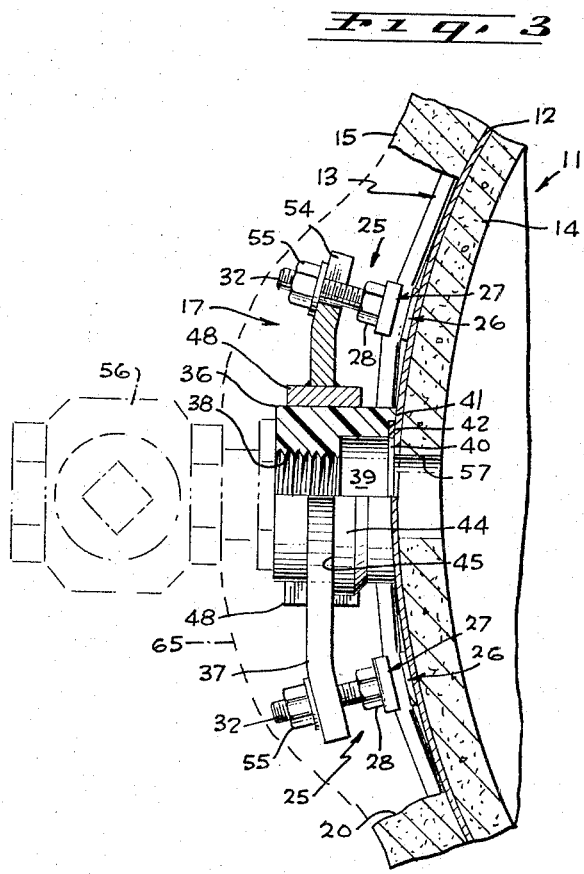
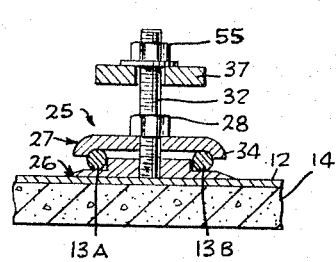
BURL B. OHNSTAD
INVENTOR.
BY
ATTORNEYS April 25, 1967 B. B. OHNSTAD 3,315,989
SERVICE OUTLET ASSEMBLY FOR REINFORCED CONCRETE PIPE
Filed May 7, 1964 2 Sheets-Sheet 2
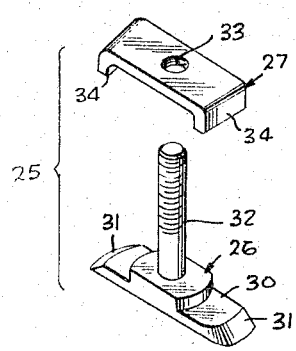
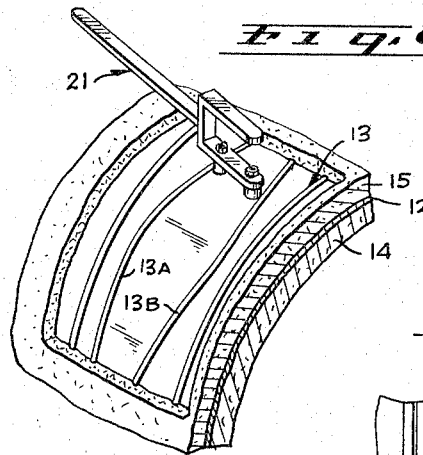
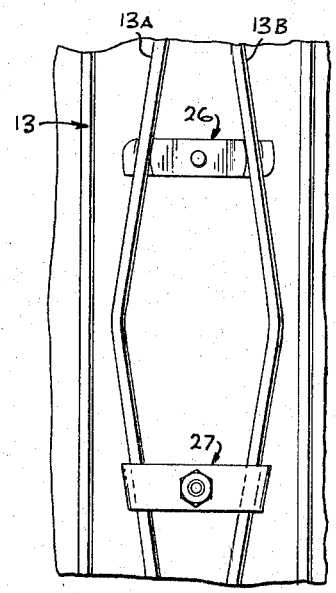
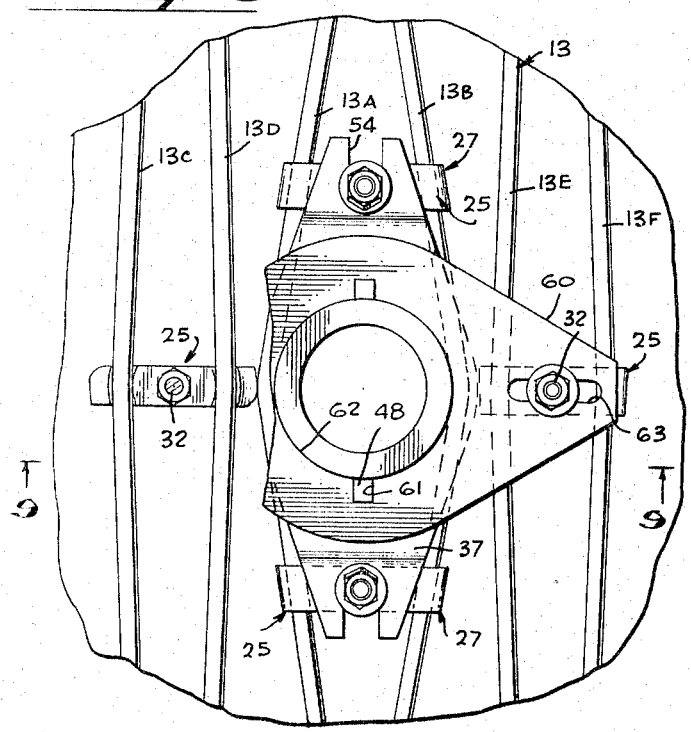
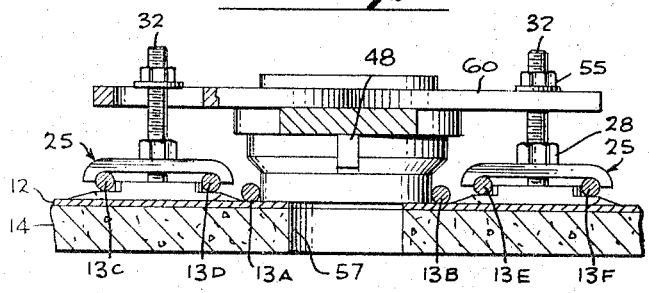
BURL B. OHNSTAD
INVENTOR.
BY
ATTORNEYS

United States Patent Office 3,315,989
Patented Apr. 25, 1967

3,315,989
SERVICE OUTLET ASSEMBLY FOR REINFORCED
CONCRETE PIPE
Burl B. Ohnstad, South Gate, Calif., assignor to American Pipe and Construction Co., Los Angeles, Calif., a corporation of California
Filed May 7, 1964, Ser. No. 365,703
6 Claims. (Cl. 285—197)

This invention has to do with tapping high pressure concrete pipe of the type having a steel cylinder shell with a helical wrapping therearound of reinforcement wire under tension.

Pipes of the type in question are used in water distribution systems and are designed to withstand high internal pressures. In order to provide service outlets as required from time to time, it is necessary to tap the pipe when it is in place in the ground. The conventional method of doing this, which has been in use for years, has several disadvantages. Such method requires that a large excavation be made to provide space completely around the pipe to be tapped, which is often from 3 to 5 feet in diameter. Also, the pipe-reinforcing wire is cut in the area to be tapped, thus disrupting the continuity of the tension wire wrap and impairing the strength of the original pipe. A saddle is then installed by use of U-bolts which extend completely around the pipe, and, to prevent corrosion, it is essential that a thin cement mortar coating be placed around the entire circumference of the pipe under the U-bolts and saddle, and subsequently a heavy mortar coating must be placed over the parts. On large diameter pipe this work is time consuming, costly and extremely difficult and is not always properly performed.

Therefore, it is an object of my invention to provide a new and improved simple method and apparatus for tapping the high-pressure type concrete pipe described above which overcome the above noted disadvantages of the present method of tapping the pipe and which possesses certain inherent advantages. In particular it is an object to provide a method and construction which do not weaken the pipe reinforcement wire.

Another object is to provide a novel method and means for tapping a high pressure concrete pipe in which the same parts are used for all tap sizes and pipe diameters over a large range.

Still another object is to provide a service outlet installation which eliminates galvanic corrosion and thus obviates a serious problem which is present in other outlet fittings. In this connection it is a further object to provide a service outlet assembly which prevents electrical current drain from cathodically protected water transmission lines.

Another object is to provide a simple service outlet assembly which is self-aligning in relation to the pipe cylinder, which can be used for wet or dry taps without change in installation procedure or equipment, and which can be installed without special tools.

These and other objects will be apparent from the drawings and the following description. Referring to the drawings:

FIG. 1 is a side elevational view of a portion of a concrete pipe in which the outer concrete body has been broken away in a small area to expose the shell and wrapping thereon and showing a service clamp assembly embodying the invention installed;

FIG. 2 is an enlarged face view of the service outlet assembly of FIG. 1 and the immediate surrounding area of the pipe;

FIG. 3 is a fragmentary cross sectional view on line 3—3 of FIG. 2;

FIG. 4 is a fragmentary sectional view on line 4—4 of FIG. 2;

FIG. 5 is an exploded isometric view of the anchor stud and anchor plate elements;

FIG. 6 is an isometric view of the area of the pipe in which the service outlet assembly is mounted and showing the step of spreading a pair of the wire reinforcement turns;

FIG. 7 is a face view similar to FIG. 6 but showing an anchor member installed and one partially installed;

FIG. 8 is a view similar to FIG. 2 but showing a form of the invention useful where large taps are to be made; and FIG. 9 is a sectional view on line 9—9 of FIG. 8.

More particularly describing the invention, numeral 11 generally designates a concrete pipe which has a steel shell 12, a helical wrapping 13 therearound of heavy gauge wire, this having originally been applied under tension and anchored under tension, an inner lining 14 of cement mortar and an outer body 15 of concrete.

The service outlet assembly which is used in tapping the pipe and which remains in place thereon is designated generally by numeral 17. In the drawing, referring first to FIGS. 1-7, the concrete outer wall 15 of the pipe has been shown broken away to form a hole 20 exposing an area of the steel shell 12 and several portions of the reinforcement wire wrapping 13. It is to be understood that the first step in the method of making the tap is to chip away the concrete to expose a portion of the shell and wire reinforcement, as shown. The next step comprises spreading an adjacent pair of turns 13A and 13B of the wire as bya tool 21 (FIG. 6). The turns should then be raised slightly by any suitable tool (not shown). Anchors 25 are then installed at two spaced regions of the spread wire turns. Each anchor includes a stud 26, a clamp plate 27 and a nut 28 (see FIGS. 4 and 5). The stud comprises a base 30 provided with beveled curved outer edges 31, so that it can be readily inserted under the wire turns, and a threaded post 32. Plate 27 is apertured at 33 to receive the post and provided with end flanges 34 to fit over the wire turns 13A and 13B.

The remainder of the service outlet assembly includes a boss or fitting 36 which is preferably made of a synthetic resin, such as an acetal resin (Delrin, produced by Du Pont, being suitable for the purpose) and a flange or flange plate 37 which serves to anchor the boss in place against the steel shell of the pipe. The boss is interiorly threaded at 38 and beyond this has an inner counterbore 39 and an end or second counterbore 40 adjacent its inner edge 41. The latter counterbore accommodates a gasket such as an O-ring 42. The inner edge 41 or face of the boss is preferably slightly concave as best seen in FIG. 3, so as to substantially fit the shell of the pipe.

The outer surface of the boss is formed with a peripheral enlargement 44 which provides a shoulder or abutment 45 against which to seat the flange 37. Also, it should be noted that the enlargement 44 on the exterior of the boss is slotted in an axial direction at 47 at diametrically opposite points to receive locking ribs 48 on the flange.

The flange comprises a steel plate with a relatively wide center section 50 and tapered end portions 51. The central portion is apertured at 52 to receive the boss 36. Adjacent the aperture, the flange is provided with the two axially extending ribs 48 which are received in the aforementioned grooves 47 in the boss. At its ends the flange is inclined as seen in FIG. 3 and slotted at 54 to accommodate the posts 32 of the studs 26. Nuts 55 serve to secure the flange.

In order to complete a tapping operation a corporation stop or valve 56 (shown in broken lines in FIG. 3) is threaded into the boss and a conventional tapping tool used in conjunction therewith to bore through the pipe shell 12 and inner mortar lining 14 to produce the hole 57 therethrough.

The construction thus far shown and described is particularly designed for small outlets, such as those less than 1½ inches in diameter. For larger outlets I prefer to employ an additional or cross flange, designated 60 as shown in FIGS. 8 and 9. This flange fits over the boss against the original flange 37 and is provided with radial recesses or slots 61 extending out from the central aperture 62 to receive the ribs 48 of the first flange. I anchor this additional or cross flange by means of two additional anchors 25 which are secured in place beneath the next outer pairs 13C, 13D and 13E, 13F of wire wrapping turns, respectively. The cross flange is slotted at 63 to receive the posts 32 of the anchors.

After the hole 57 has been made in the pipe, the tapping tool removed, and the service pipe attached to the valve 56, cement mortar is applied to cover the parts up to the valve 56 as indicated by the line 65 in FIG. 3.

It will be apparent that the construction and method described readily meets the objectives set forth herein. In particular, it should be noted that the strength of the pipe is not impaired, that the service line is electrically insulated from the main pipe by the electrically nonconductive boss or fitting 36, that a positive seal is established and maintained between the boss and the pipe shell, and that the method can be readily carried out with a minimum of labor.

Although I have shown and described preferred forms of my invention, I contemplate that various changes and modifications can be made therein without departing from the invention, the scope of which is indicated by the following claims.

I claim:

1. A service outlet assembly for use in tapping high pressure type concrete pipe embodying a steel shell with a helical wrapping therearound of reinforcement wire under tension and providing a service outlet from the pipe, a tubular boss against said shell between two turns of the wire wrapping, anchor means attached to said two turns, said anchor means comprising a stud on each side of said boss having a base portion beneath the wire turns, a post extending therefrom, a clamp plate receiving said post and overlying said wire turns and means securing the clamp plate to the post, a flange plate partially receiving and abutting said boss, said flange plate receiving said posts of the anchor means, and means securing said flange plate to the posts of said anchors.

2. The service outlet assembly set forth in claim 1 in which interengaging means are provided on said boss and said flange plate preventing relative rotation thereof.

3. The service outlet assembly set forth in claim 2 in which said boss is made of plastic.

4. A service outlet assembly for use in tapping high pressure type concrete pipe embodying a steel shell with a helical wrapping therearound of reenforcement wire under tension and providing a service outlet from the pipe, a tubular fitting against the pipe shell, a seal ring between the fitting and shell, said fitting having a radial abutment shoulder on its outer surface facing away from said pipe, a flange plate receiving said fitting and abutting said shoulder, and means attached to the flange plate and secured directly to the reinforcement wire for anchoring said tubular fitting to said pipe whereby said means forces said fitting and said seal ring against said shell.

5. A service outlet assembly for use in tapping high pressure type concrete pipe embodying a steel shell with a helical wrapping therearound of reinforcement wire under tension and providing a service outlet from the pipe, a tubular fitting against the pipe shell, a seal ring between the fitting and shell, said fitting having a radial abutment shoulder on its outer surface facing away from said pipe, a first flange plate receiving said fitting and abutting said shoulder, a second flange plate receiving said fitting and abutting said first flange plate, means anchoring said first flange plate to the reinforcement wire of the pipe, and means anchoring said second flange plate to portions of the reinforcement wire of the pipe spaced axially and circumferentially of the first mentioned anchoring means.

6. A service outlet assembly for use in combination with a high pressure type concrete pipe embodying a steel shell with a helical wrapping therearound of reinforcement wire under tension and providing a service outlet from the pipe, a tubular boss against said shell between two turns of the wire wrapping, anchor means attached to said two turns, a flange plate partially receiving and abutting an outwardly facing portion of said boss, and means securing said flange plate to said anchor means, including a pair of anchor members spaced circumferentially of the pipe and positioned beneath the two turns of the wire wrapping.

References Cited by the Examiner

UNITED STATES PATENTS

| 444,235 | 1/1891 | McHugh | 285—197 |
| 1,946,237 | 2/1934 | Robertson | 285—197 |
| 2,100,884 | 11/1937 | Trickey | 285—199 |
| 2,375,921 | 5/1945 | Hirsh. | |
| 2,997,316 | 8/1961 | Recht | 285—197 X |
| 3,070,874 | 1/1963 | Davis | 29—157 |
| 3,104,456 | 9/1963 | Powell | 29—157 |

FOREIGN PATENTS 625,461   8/1961   Canada.

CARL W. TOMLIN, Primary Examiner.

THOMAS F. CALLAGHAN, Examiner.